United States Patent Office 3,323,902
Patented June 6, 1967

3,323,902
PROCESS FOR PRODUCING A FINELY DIVIDED TRANSITION METAL
Wolfram R. Kroll, Linden, N.J., assignor to Esso Research and Engineering Company, a corporation of Delaware
No Drawing. Filed May 17, 1963, Ser. No. 281,347
6 Claims. (Cl. 75—.5)

This invention relates to a novel catalyst system which has utility in a number of environments such as in hydrogenation and electrochemical cells. More particularly, the invention relates to particular complex systems of Ziegler-type catalysts, and derivatives of such systems, all of which exhibit exceptionally high activity in the above-mentioned environments.

Heterogeneous Ziegler-type catalysts are well known in the art. U.S. Patent 2,781,410, for example, discloses a polymerization catalyst which is composed of aluminum trialkyl and trace amounts of colloidal nickel. Despite exhaustive investigation the potential usefulness of these catalyst systems for reactions other than polymerization and displacement has gone practically unrecognized until the present. It has now been discovered that it is possible to modify these heterogeneous systems in such a manner that complex catalyst system of vastly new properties will result.

It is an object of this invention to provide a novel complex catalyst system.

It is a further object of this invention to provide a complex catalyst system which is highly active as a hydrogenation catalyst under mild conditions of temperature and pressure.

Still another object of this invention is to provide a complex catalyst system for selective hydrogenation of olefins.

A further object of this invention is to provide a catalyst which is capable of forming a highly active electrode in an electrochemical cell.

These and other objects are accomplished by the reduction of a transition metal salt with an organoaluminum compound under critical conditions which favor the formation of a metal organic complex between the aluminum organic component and the transition metal component in a lower valence state. The system produced in this manner may be utilized for rapid hydrogenation of olefinic materials at low temperatures and pressures. Furthermore, by properly selecting the components of the catalyst system it is possible to obtain a system which may be used for selective hydrogenation of olefinic materials. The catalyst systems may also be further treated to provide a finely divided transition metal. These metals have many potential catalytic uses. An important example of such use is as an electrode/catalyst in electrochemical cells.

The metal salts reduced to form the catalyst system of this invention are transition metal salts. Metals selected from each of Groups I–B to VII–B of the Periodic Table may be successfully reduced and utilized in this invention. For example, copper, zinc, titanium, vanadium, chromium and platinum salts have all been employed to yield active catalyst systems. Particularly preferred metal salts are those of the noble metals and Group VIII–B metals, such as iron, cobalt, nickel and platinum.

The selection of the anionic component of the transition metal salt is not critical and both organic and inorganic components may be employed. Examples of inorganic radicals which may be employed are chlorides, bromides, $SiF_6^-$. However, organic radicals as acetates and naphthenates are preferred components of the metal salts because of their excellent solubility and drying characteristics. A particularly preferred organic component is the chelate, e.g. the acetylacetonate, due to its excellent solubility and ready availability. Of course other chelates can be employed as e.g. dimethylglyoxime derivatives.

The selection of a reducing agent is critical since it may have an important effect on the activity of the soluble catalyst system. The preferred reducing agents are organoaluminum compounds of the general formula $AlR_1R_2R_3$ or $AlR_1R_2OR_3$ or $AlR_1R_2H$ where $R_1$, $R_2$ and $R_3$ may be the same or different and are represented by R=alkyls and cycloalkyls, e.g., ethyl, butyl, cyclohexyl, cyclopentadienyl, R=aromatics, e.g., phenyl, naphthyl, R=alkylaryls, e.g., benzyl. In general any R group having 1 to 20 carbon atoms may be employed. Particularly preferred organoaluminum compounds are $Al^1(i-C_4H_9)_3$, $Al^1(C_2H_5)_3$, $Al^1(i-C_4H_9)_2H$ and $Al^1(C_2H_5)_2OnC_4H_9$. In a less preferred embodiment, halogen substituted organoaluminum compounds may be employed. However, the activity of these latter catalytic systems is substantially reduced.

The ratio of transition metal salt to organoaluminum compound is a critical feature of this invention. In order to obtain the highly active catalyst system it is essential that the molar ratio of aluminum to transition metal be within the range of 1/1 to 10/1 and preferably 1/1 to 4/1. By comparison, the prior art for example U.S. Patent 2,781,410, describes conventional Ziegler type polymerization catalysts which utilize only trace amounts of transition metal and have molar ratios of as high as 5000/1. While no sufficient explanation is available experimental data indicates that ratios of aluminum to transition metal above 10/1 poison the activity of the catalyst. Limited amounts of poisoning, however, represent a useful technique for highly selective hydrogenation reactions. Thus for certain applications such as saturation of a side chain of an unsaturated cyclic compound without saturation of the cyclic nucleus or in removal of acetylenic impurities from olefinic compounds, molar ratios of transition metal to aluminum of 10/1 to 20/1 and preferably 10/1 to 15/1 may be successfully employed.

The proper proportions of transition metal salt and organoaluminum compound are mixed in a solvent to obtain the homogeneous catalyst system of this invention. The conditions of preparation are not critical in most cases and ambient conditions of temperature and pressure are sufficient. However, reductions may be carried out at temperatures in the range of $-10°$ C. to $+100°$ C. Under circumstances where the transition metal compound does not instantaneously dissolve in the solvent the reduction may be accelerated without deleterious effect by employing temperatures in the upper portion of the above range. The solvent employed in the catalyst system may be a hydrocarbon or a polar compound which does not have acid hydrogen constituents such as a Lewis base. Preferred hydrocarbon solvents are $C_5$ to $C_{20}$ aliphatics, such as pentane and heptane and $C_6$ to $C_{12}$ aromatics, such as benzene. Preferred polar compounds are ethers, such as diethylether, p-dioxane, dimethoxyethane, diglyme and tertiary amines such as triethylamine, n-methyl-morpholine. Ethers are particularly preferred since they exhibit a tendency to retard the poison effect of excessive proportions of organoaluminum compound and therefore permit the use of higher Al/metal molar ratios than previously discussed.

The catalyst system described above may be utilized as a highly active species of hydrogenation catalyst. It has been discovered that these systems have superior activity when compared to commercially employed Raney metal catalysts. A wide variety of compounds may be reduced with this catalyst system. Thus, any olefinic hydrocarbon may be saturated by hydrogenation in the presence of the complex catalyst system of this invention. This would include both acyclic and cyclic mono-, di- and tri-olefins. Typical examples of such olefinic compounds are butene, octene, cyclohexene, cyclododecatriene and norbornylene. In addition, the catalyst of this invention may be utilized in the reduction of other unsaturated compounds such as nitriles and acetylenes.

Less preferred feedstocks which may be reduced by the novel catalyst system includes aldehydes, ketones and esters.

The hydrogenation conditions may vary over wide limits depending upon the particular feedstock employed. Hence, the hydrogenation of olefinically unsaturated materials will take place rapidly at temperatures in the range of −20° C. to +150° C. and preferably 0° C. to 50° C. and pressures in the range of atmospheric pressure to 2000 p.s.i.g., preferably 100 to 1000 p.s.i.g. When more difficultly reducible feedstocks, such as nitriles, are employed the reaction rate is enhanced by higher temperatures and temperatures up to about 200° C. may be employed.

The length of the hydrogenation reaction is not critical and reaction times ranging from 15 minutes to 10 hours may be employed. Similarly, the concentration of catalyst may vary over wide limits with only small amounts being sufficient to effect substantial conversions of the feedstock. Ordinarily .001 to 1%, preferably .01 to .1% of the transition metal based on feed to the reaction, may be employed.

In another embodiment of the present invention, it has been discovered that certain of the above-described catalyst systems exhibit an ability to selectively hydrogenate certain types of unsaturation in preference to other types. For example, acetylenic compounds which are present in only trace amounts may be selectively saturated to the olefin without saturating any olefins present in a system containing mixtures of these materials. In addition, terminal olefinic bonds may be selectively reduced in preference to internally bonded olefinic structures. This selective reduction will take place even when both types of bonds are present in the same molecular structure.

The feedstocks to the selective hydrogenation reaction may be substantially the same as described above in connection with the general hydrogenation reaction. However, selective hydrogenations will be governed by catalyst activity. Hence, the selective reactions will be operated at lower temperatures and pressures and with smaller amounts of active catalyst. Furthermore, by proper selection of catalyst components, systems of lower than average activity may be prepared. These less active forms of catalyst exhibit an even greater propensity for selective hydrogenation. Typical examples of selective hydrogenations which are possible with the catalysts of this invention are the reduction of vinylcyclohexene to ethylcyclohexene and cyclopentadiene to cyclopentene. In yet another embodiment of this invention, it has been discovered that by proper treatment of the above-described complex catalyst system it is possible to obtain the transition metal itself in such finely divided form that the metal is in an amorphous rather than crystalline state. This result is indeed surprising since commercial metal powders are generally crystalline or contain at least a large portion of crystalline material. Furthermore, most commercial metal powders are larger than 0.1 micron whereas the finely divided metals of this invention are much smaller and in some cases can not be accurately measured due to their minute size.

The finely divided metals of this invention are obtained by hydrolysis of the complex catalyst system comprising a transition metal salt and an organoaluminum reducing agent which has been described earlier in this specification. The hydrolysis is accomplished by the addition of either a dilute acid or a dilute base to the complex catalyst system. The selection of the particular aqueous acid or base is not critical and any conventional materials may be employed. The concentration of the hydrolyzing medium should range from 2 to 20 wt. percent and preferably 5 to 10 wt. percent. A critical feature in the hydrolysis of the soluble system to yield the pure metal is the selection of an acidic or basic hydrolyzing media. This choice is governed by the particular transition metal present in the complex system. Those skilled in the art will realize that certain transition metals are soluble in acid and will in such instances employ a basic hydrolyzing agent. In other instances acid hydrolysis will necessarily be employed due to dissolution of the transition metal in basic solutions.

The above-described method of obtaining finely divided metals is equally amenable to the production of finely divided metal alloys. Thus, complex catalysts systems comprising two or more transition metal salts and an organoaluminum reducing agent may be hydrolyzed thereby yielding a precipitate which is an alloy of the free transition metals. By the present process it is therefore possible to obtain alloys of noble metals such as platinum, palladium, iridium, rhodium, ruthenium and osmium or alloys which are composed of a noble metal and some other transition metal such as iron, cobalt, nickel, molybdenum, chromium, manganese, tungsten, titanium, rhenium, zinc, copper, cadmium and vanadium. Although no sufficient theoretical explanation is available, it has now been found that the hydrolysis of a complex catalyst system containing both acid and base soluble metals results in the production of alloys. For example, a platinum-rhenium alloy will be produced by acid hydrolysis although rhenium is known to be soluble in acid. It is believed that the rhenium is chemically adsorbed by the platinum in a manner that prevents its dissolution. However, the actual mechanism is unknown.

In an alternate embodiment of this invention the hydrolysis may be carried out by utilizing an excess of water, alcohol or other acid hydrogen donor such as a secondary amine. This procedure differs from the acidic or basic hydrolysis previously discussed in that the hydrolyzing medium does not possess sufficient strength to dissolve the aluminum present in the complex system. The lack of ability to dissolve the aluminum results in the precipitation of an aluminum hydroxide gel which surrounds the precipitated transition metal or alloy particles thereby preventing agglomeration of these minute amorphous metallic particles. In a series of subsequent operations the precipitate may be filtered from the solution and applied to the surface of a catalytic support such as alumina, silica or carbon. By subsequent calcination both the alumina gel and transition metal oxides are formed. The transition metal oxide may then be reduced to the metal by reduction in a hydrogenation atmosphere. Thus the overall procedure results in a supported catalyst having a widely dispersed metal or metal alloy deposited on its surface. Such a catalyst is highly active for a wide variety of operations, for example, low temperatures in the range of 400–600° C. steam cracking to produce town gas.

It is a further feature of this invention that the unique finely divided metals and metal alloys produced, as described above, may be employed as catalysts in electrochemical cells. Electrodes suitable for use in these cells have varied considerably in both design and composition. Although a single metal structure, e.g. a platinum sheet or screen, or a suitable structure of porous carbon can be used alone, such electrodes commonly comprise a conductive base structure and a catalyst chemically and/ or physically bound to the surfaces of the base. Such electrodes include those wherein the electrode base structures are porous, nonporous, metallic or non-metallic.

The catalyst may be deposited on the electrode by any of the convenient methods known in the art. Typical methods include coating the electrode base member with an organic solvent containing the free metal and subsequently evaporating the solvent and also the application of an organic binder containing the free metal to the surface of the electrode base. A preferred method of applying the catalyst of the present invention to an electrode is by means of mechanical pressure. In this manner the catalyst is pressed onto the electrode in the absence of any solvents or binders.

The electrochemical cells in which the above-described electrodes are employed are well known in the art (see for example U.S. Patent 2,384,463). These cells may function as either electrolytic cells or as fuel cells. The term "fuel cell" is used herein and in the art to denote a device, system or apparatus wherein chemical energy of a fluid combustible fuel such as hydrogen, carbon monoxide or an organic compound containing hydrogen in its molecular structure is electrochemically converted to electrical energy at a non-sacrificial or inert electrode. The true fuel cell is adapted for continuous operation and is supplied with both fuel and oxidant from sources outside the cell proper. Such cells include at least two non-sacrificial or inert electrodes, functioning as an anode and cathode, respectively, which are separated by an electrolyte which provides ionic conductance therebetween, conduction means for electrical connection between anode and cathode external to the electrolyte, means for admitting a fluid fuel into dual contact with the anode and electrolyte and means for admitting an oxidant into dual contact with the cathode and electrolyte. Where necessary or desired, the electrolyte compartment is divided into an anolyte compartment and a catholyte compartment by an ion-permeable partition or ion-exchange membrane or a plurality of same. Thus, in each such cell a fuel is oxidized at the anode and an oxidant is reduced at the cathode upon receiving electrons from such cathode.

The invention will be further understood by reference to the following examples.

*Example 1*

Approximately 100–120 mg. of acetylacetonates of iron, cobalt and nickel were weighed and charged to a reaction vessel. The respective salts were then reduced (as indicated in the table) with either a solution containing 2 ml. triisobutyl-aluminum in 10 ml. of heptane or 3 ml. of n-butoxy-aluminum diethyl in 10 ml. of heptane. The reductions occur instantaneously and a homogeneous solution is obtained. In some cases a precipitate is observed which dissolves upon dilution. 100 ml. of an 8% solution of cyclohexene in heptane was added to the catalyst system and the mixture was hydrogenated at a constant temperature of 22° C. and a constant pressure of 100 p.s.i.g. under stirring. Samples were taken from time to time and analyzed by gas chromatography.

Similar hydrogenations were also carried out utilizing the same feed, solvent, temperature and pressure and a Raney nickel catalyst. The results are tabulated below:

TABLE I

| Catalyst | Reducing Agent | Solvent | Time for 50% Conversion, minutes |
| --- | --- | --- | --- |
| 76 mg. Raney nickel | | n-Heptane | 115 |
| 17 mg. Fe | $Al(i-C_4H_9)_3$ | do | 57 |
| 25 mg. Co | $Al(i-C_4H_9)_3$ | do | 37 |
| 26 mg. Ni | $Al(C_2H_5)_2On(C_4H_9)$ | do | 38 |

The tabulated data indicate the much higher hydrogenation rate of the reduced catalysts compared with conventional Raney nickel under comparable conditions.

*Example 2*

In a procedure similar to Example 1 several transition metal salts and chelates were reduced and screened for hydrogenation activity. The catalysts were prepared by treating approximately .4 mM. of the transition metal compound with 4 mM. of the organo-aluminum reducing agent in a heptane solvent. Hydrogenation conditions and feeds similar to those employed in Example 1 were utilized. The results are tabulated below:

TABLE II

| Transition Metal in Catalyst | Reducing Agent | Solvent | Time for 50% Conversion, minutes |
| --- | --- | --- | --- |
| Pt | $Al(i-C_4H_9)_3$ | Heptane | 29 |
| Cr | $Al(i-C_4H_9)_3$ | do | 109 |
| V | $Al(i-C_4H_9)_3$ | do | 112 |

It can readily be seen that the results reported show superior activity when compared with the Raney nickel catalyst reported in Table I. Additionally, similar experiments were carried out with titanium, manganese, copper and zinc complex catalyst systems and hydrogenation activity was observed although of a lesser degree than tabulated above.

*Example 3*

Following the procedures outlined in Examples 1 and 2 above, several experiments were carried out to determine the utility of other reducing agents and solvents in the complex catalytic system. The results are tabulated below:

TABLE III

| Transition Metal | Reducing Agent | Solvent | Time for 50% Conversion, minutes |
| --- | --- | --- | --- |
| Co | $Al(i-C_4H_9)_3$ | Heptane | 34 |
| Co | $Al(i-C_4H_9)_3$ | Dimethoxyethane | 38 |
| Co | $Al(i-C_4H_9)_3$ | Triethylamine | 40 |
| Co | $Al(i-C_4H_9)_3$ | Benzene | 30 |
| Co | $Al(C_2H_5)_3$ | Heptane | 31 |
| Co | $HAl(i-C_4H_9)_2$ | do | 33 |

The data indicate that a wide variety of solvents and reducing agents may be used in the complex catalyst system of this invention.

*Example 4*

110 mg. of cobalt acetylacetonate were reduced with 1.6 gm. of triethyl aluminum. The molar ratio of Al/Co was approximately 35/1. A solution of cyclohexene was added to the catalyst system and the mixture was hydrogenated at a constant temperature of 22° C. and a constant pressure of 100 p.s.i.g. Analysis of the final product indicated that there was no conversion of cyclohexene to cyclohexane. Similar results were obtained utilizing other trialkyl aluminum compounds as reducing agents and organoaluminum monochlorides.

The results indicate that the preferred conventional Ziegler polymerization catalyst compositions do not exhibit effective hydrogenation activity due to the critical nature of the Al/transition metal ratio.

*Example 5*

54 g. cyclododecatriene were hydrogenated at 50° C. and a constant hydrogen pressure of 1000 p.s.i. The catalyst was prepared in the following way: 143 mg. ferric-acetylacetonate were reduced with 2 ml. triisobutyl-aluminum in 10 ml. pentane. The reduction takes place immediately yielding a dark homogeneous product. To this is added the CDT and hydrogen pressured on. The reaction starts immediately which is noticed by a temperature rise. Samples are taken in intervals and analyzed by gas-chromatography.

TABLE IV

| Time (Min.) | Weight Percent | | | |
|---|---|---|---|---|
| | CDA [1] | CDE [2] | CDDE [3] | CDT [4] |
| 29 | 47.9 | 44.3 | 7.1 | 0.7 |
| 44 | 78.9 | 21.0 | 0.6 | |
| 91 | 100 | | | |

[1] Cyclododecane.
[2] Cyclododecene.
[3] Cyclododecadiene.
[4] Cyclododecatriene.

This example indicates that polyolefinic materials may be successfully hydrogenated by this invention.

*Example 6*

250 mg. cobalt-acetylacetonate was reduced with 2 ml. triisobutyl-aluminum to yield a homogeneous solution. To the catalyst thus obtained 40 g. benzonitrile were added and the hydrogenation performed at 1000 p.s.i. $H_2$ and 150° C. Within 6 hours all nitrile was converted to the corresponding amine. This example indicates that functional groups other than olefins may be reduced by the catalysts of this invention.

*Example 7*

105 mg. nickel-acetylacetonate were reduced at −6° C. with a solution of 3 ml. triisobutyl-aluminum in 50 ml. pentane. Then 44 g. cyclopentadiene monomer were added and the hydrogenation carried out at −6° C. and 1000 p.s.i. hydrogen pressure. Samples were withdrawn from time to time to evaluate the progress of the hydrogenation. The following table illustrates the selective hydrogenation achieved with the complex catalyst system:

TABLE V

| Percent Cyclopentadiene | Percent Cyclopentene | Percent Cyclopentane | Time (Minutes) |
|---|---|---|---|
| 63.7 | 32.2 | 2.1 | 45 |
| 31.4 | 64.8 | 4.0 | 150 |
| 24.1 | 70.8 | 5.1 | 175 |
| 2.7 | 87.5 | 9.7 | 260 |

The results indicate that under controlled reaction conditions the catalyst systems of this invention may be made effective for highly selective hydrogenation.

*Example 8*

103 mg. cobalt-II-acetylacetonate in 6.8 g. diethylether are reduced with 1.6 g. triisobutyl-aluminum dissolved in 5 g. heptane. To this is added 10 g. 4-vinyl-cyclohexene-1 in 50 g. heptane solvent. The hydrogenation is carried out at 22° C., 100 p.s.i. under stirring. After 10 minutes of hydrogenation there is no more vinyl-cyclohexene left, and 97% ethylcyclohexene and 3% ethylcyclohexane have been produced. Thus the high selectivity of this catalyst has been demonstrated.

*Example 9*

110 mg. cobalt-II-acetylacetonate were dissolved in 4.3 g. dimethoxy ethane and reduced with 1.6 g. triisobutyl-aluminum in 5 g. heptane. To this was added .5 g. phenylacetylene and 53 g. of a heptane solution of hexene-1, containing 6.6 g. hexene-1. The solution was hydrogenated at 22° C. and 100 p.s.i. hydrogen under stirring. The first sample after 10 minutes showed no phenylacetylene whereas only a trace of the hexene-1 was hydrogenated and no hexene-1 was isomerized. This example illustrates that the novel catalyst system can be used with advantage to remove traces of acetylenic compounds from feedstreams containing olefinic hydrocarbons.

*Example 10*

(a) The preparation of a finely divided metal is reported. 108 mg. cobalt-II-acetylacetonate in dimethoxyethane are treated with 800 mg. triisobutyl-aluminum in heptane. After completion of the reduction the solution is added slowly to 20 ml. degassed concentrated sodium hydroxide solution. After half an hour stirring at room temperature, the finely divided metal was floating between the two layers and could be recovered by decanting and drying. The solid recovered is magnetic and consists of small, needle like pieces with a length of .1 micron and a diameter of .02 micron. It consists of active cobalt with small amounts of aluminum.

(b) 1.414 g. $PtCl_4$ were dissolved in diglyme and reduced with 13.2 g. triisobutyl-aluminum during 30 minutes. A dark colored, soluble system was obtained. This then was alcoholyzed with methanol followed by hydrolysis with dilute sulfuric acid. A black solid was obtained, which after drying was analyzed. It was not crystalline and was highly pyrophoric. Analysis showed 98.2% Pt and .4% Al.

*Example 11*

751 mg. $PtCl_4$ and 287 mg. $Re_2O_7$ were treated with dimethoxy-ethane and then reduced with 2.4 g. triisobutyl-aluminum. After the reduction a dark colored solution was obtained. This solution was then hydrolyzed with 10% sodium hydroxide solution and the resulting solid precipitated by centrifugation. After repeated washing with water a black solid was obtained containing an approximate ratio (molar) of rhenium to platinum of 1:5 and traces of aluminum. The material is mostly amorphous or microcrystalline.

*Example 12*

A finely divided platinum metal was prepared as described in Example 10(b). However, the solid platinum obtained from the hydrolysis was kept moist because of its extreme sensitivity towards oxygen. The moist platinum metal was mechanically pressed on a platinum screen. This pressing process is extremely delicate since it involves the protection of the active metal as well as the application of sufficient pressure to cause adhesion of the metal to the screen. Upon completion of the pressing process, the metal containing screen was ready for use as an electrode without further treatment. By a similar procedure the active metal may be pressed onto a non-metallic support such as graphite.

*Example 13*

A finely divided Pt-Re catalyst powder that was prepared by the technique of Example 11 and a Pt powder prepared as in Example 10(b) were stored in demineralized $H_2O$ after washes with dilute $H_2SO_4$ and $H_2O$. These powders were then evenly spread onto 80 mesh Pt screens of 4 cm.$^2$ area as a moist slurry. 10–15 mg./cm.$^2$ of the catalyst were used to completely cover the surface in each instance. The electrode screens were backed with a Pt foil (0.003 inch thick), also of 4 cm.$^2$ area, and were connected to a 0.040 inch Pt lead wire. The catalyst was bonded to the electrode structure in a hydraulic press at 3000 p.s.i. at room temperature. These electrodes were then used as an anode in a driven methanol-air fuel cell. The cell was filled with electrolyte of 3.7 M $H_2SO_4$ (preelectrolyzed) and 1.0 M $CH_3OH$ and was kept at 140° F. The driven counter electrode (cathode) was a bright Pt foil of 6 cm.$^2$ area. The electrochemical potential of the anode was measured against a 4 n Ag/AgCl reference electrode at different current densities and the polarization vs. theoretical $CH_3OH$ oxidation potential calculated.

Typical polarization values are:

| Electrode | Polarization in V vs. theoretical CH₃OH at indicated current densities in m.a./cm.² | | | | |
|---|---|---|---|---|---|
| | 0 | 1 | 10 | 50 | 100 |
| Pt | 0.40 | 0.49 | 0.55 | 0.59 | 0.61 |
| Pt-Re (33% Re) | 0.29 | 0.37 | 0.47 | 0.54 | 0.57 |

The above examples are presented merely to aid in understanding the present invention and are not to be considered as limiting since other embodiments may occur to those skilled in the art. For example, the highly active complex catalyst system of the present invention may be prepared in an insoluble form which will retain the activity advantages of the soluble system while at the same time yielding a more economically attractive system. This result may be accomplished by depositing a solution of a transition metal on the surface of a suitable carrier or support and subsequently reducing said surface with an organoaluminum compound in such a manner that a system analogous to the soluble system of this invention becomes integrally bound with the surface of the catalyst support. Such a system is potentially attractive for a variety of reactions such as hydrogenation, isomerization, oxidation, dehydration and cracking.

Additionally, the finely divided metal powders prepared by this invention possess properties which make them potentially attractive in areas other than catalysis as described herein. For example, the pyrophoric nature of these metals indicates that they may be used to give reliable low ignition temperatures in either solid or liquid propellants. In addition, the metal powders may be utilized in the preparation of dispersion strengthened alloys which have a wide variety of high temperature service applications.

Having thus described the general nature and specific embodiment of the invention, the true scope is now pointed out by the appended claims.

What is claimed is:

1. A process for producing a finely divided transition metal which comprises preparing a homogeneous solution of a transition metal salt with an organoaluminum compound selected from the group consisting of $AlR_1R_2R_3$, $AlR_1R_2H$ and $AlR_1R_2OR_3$ wherein $R_1$, $R_2$ and $R_3$ contain 1 to 20 carbon atoms and are selected from the group consisting of alkyl, cycloalkyl, aryls and alkaryls, said transition metal and aluminum being present in a molar ratio in the range of 1:1 to 1:10, in a solvent selected from the group consisting of hydrocarbons and Lewis bases, precipitating said finely divided transition metal by adding to said homogeneous solution an amount of aqueous hydrolyzing agent sufficient to precipitate said transition metal as a finely divided metal, and recovering said finely divided transition metal precipitate.

2. The process of claim 1 wherein said transition metal is platinum.

3. The process of claim 1 wherein said hydrolyzing agent is an aqueous sodium hydroxide solution.

4. A process for producing a finely divided transition metal alloy which comprises preparing a homogeneous solution consisting of the salts of different transition metals with an organoaluminum compound, said transition metals and aluminum being present in a molar ratio in the range of 1:1 to 1:10, in a solvent selected from the group consisting of hydrocarbons and Lewis bases, precipitating said finely divided transition metal alloy by adding to said homogeneous solution an amount of aqueous hydrolyzing agent sufficient to precipitate said transition metals as a finely divided alloy, and recovering said finely divided transition metal alloy precipitate.

5. The process of claim 4 wherein said transition metals are platinum and rhenium.

6. The process of claim 4 wherein said hydrolyzing agent is an aqueous alkali metal hydroxide.

References Cited

UNITED STATES PATENTS

| 2,787,540 | 4/1957 | Appell | 75—109 |
| 2,863,761 | 12/1958 | Ashley et al. | 75—121 |
| 3,061,424 | 10/1962 | Nitzsche et al. | 75—108 |
| 3,107,996 | 10/1963 | Goldstein | 75—108 |
| 3,110,631 | 11/1963 | Carlton | 136—86 |
| 3,110,747 | 11/1963 | Mullineaux | 260—683.9 |
| 3,113,986 | 12/1963 | Breslow et al. | 260—683.9 |
| 3,116,169 | 12/1963 | Thompson | 136—86 |

DAVID L. RECK, *Primary Examiner.*

ALPHONSO D. SULLIVAN, *Examiner.*

S. P. JONES, N. F. MARKVA, *Assistant Examiners.*